United States Patent Office 3,305,508
Patented Feb. 21, 1967

3,305,508
EMULSIFICATION IN PRESENCE OF AN ALIPHATIC OXYGEN COMPOUND
Gerardus E. La Heij and Jacques A. Waterman, Amsterdam, Netherlands, assignors to Shell Oil Company, New York, N.Y., a corporation of Delaware
No Drawing. Filed Dec. 13, 1963, Ser. No. 330,266
Claims priority, application Netherlands, Feb. 5, 1963, 288,572
6 Claims. (Cl. 260—29.7)

The invention relates to a process for the preparation of aqueous dispersions of homopolymeric or copolymeric macromolecular substances obtained by polymerization, polycondensation or polyaddition of vinylidene compounds. More in particular, the preparation of artificial latices is contemplated.

If necessary, increased temperature and/or pressure can be applied in preparing the solutions of the macromolecular substances.

If in preparing artificial latices, one fails to take special measures during and/or after emulsification, very troublesome foam formation occurs when the solvent is removed via the vapor phase, even if the concentration of emulsifier is quite low, and this is accompanied by partial coagulation and often by the formation of "slime." By "slime" is understood a slimy mixture, presumably consisting of a continuous solvent phase in which droplets of water are dispersed, which contain polymer particles that have been only partially freed of solvent and are hence in a strongly swollen state. Moreover, if high emulsifier concentrations are not applied, the latices thus obtained are very coarse, which makes them unsuitable for being concentrated to what are called foam latices, from which foam rubbers can be manufactured. In addition, such coarse dispersions, when concentrated, do not produce latices that are suitable for dipping processes. If this process is carried out with higher emulsifier concentrations and/or if pressure is reduced during the removal of the solvent, surface dehydration of the foam formed will further increase the losses due to coagulation and slime formation. The latices of non-rubberlike polymers, such as those of polystyrene or of styrene/butadiene copolymers with a high styrene content, can very suitably be mixed with, say, foam rubber latices, in order to prepare therefrom foam rubbers having improved mechanical properties.

Processes are known for the preparation of artificial latices from diene polymers or copolymers, in which the emulsification of the solutions of such polymers can be effected. For instance, they may be formed in the presence of organic oxygen compounds that are highly soluble in water, such as readily water-soluble alcohols, ketones or ethers. Under the conditions at which the solvent is removed, the oxygen compounds previously used are generally completely miscible, at the emulsification temperature and pressure, with the quantities of solvent used for the polymer and with water. The application of the aforesaid organic oxygen compounds aimed at improving the emulsification. The entire quantity of such compounds was therefore admixed before emulsification.

It was found that in the processes just described, during the removal of the solvent for the polymer via the vapor phase, there is no longer troublesome foaming, while no "slime," or scarcely any, is formed, provided the ratio by volume of the sum of polymer and solvent to the sum of water and organic oxygen compounds is not too high and the quantity of these oxygen compounds is not too low. Applying equal emulsifier concentrations, the average particle size of the resultant latices is then considerably smaller than when the processes are carried out in the absence of organic oxygen compounds, but notwithstanding the reduced foam formation the losses of coagulum are high. This is because coagulation is then caused by the comparatively large amount of highly water-soluble organic oxygen compounds that is needed, even when the concentration of emulsifier is but low, for suppressing troublesome foam formation. Moreover, these processes are not sufficiently flexible, because, on the one hand, enlargement of the latex particles through reduction of the emulsifier concentration does not permit of a proportional reduction in quantity of organic oxygen compounds and hence involves greater coagulum losses, and, on the other, reduction of particle size by raising the emulsifier content cannot be achieved without sacrificing the advantage of suppressing troublesome foam formation, or without increasing the quantity of organic oxygen compounds and hence also further increasing the coagulum losses.

Because of this the particle size is often too small for the preparation of good macromolecular foams and too large for preparing latices of the quality that is the most desirable for dipping processes.

It has now been found that not only can the aforesaid troublesome foam and slime formation be avoided, but the losses through coagulation can also be obviated entirely or almost entirely, while, in addition, within certain limits the particle size of the latices can be controlled by adjusting the emulsifier concentration, without sacrificing the advantages mentioned before.

Now in accordance with this invention, the process is carried out in the presence of certain aliphatic organic oxygen compounds, which are in this case, too, brought into contact with the other substances exclusively before vaporization of the polymer solvent and which (a) In the conditions under which the solvent for the polymer is removed, do not have an acid reaction towards the water phase (which therefore rules out, for instance, esters that are hydrolyzed under such conditions and also phenols), and (b) In the quantity applied, are completely miscible at 30° C. with the quantity of solvent applied.

The distinctive features are now, however:

(1) That the organic oxygen compounds applied are poorly soluble in water, that is to say, that at 30° C. their solubility in water is less than 20 g. per 100 ml., and (2) That the quantity of oxygen compounds applied, as referred to water phase, is 0.5–30% by volume.

As a rule the emulsification takes place under normal temperature and pressure conditions, but in certain cases it may be carried out at higher or lower temperature and/or pressure.

The aliphatic oxygen compounds useful for this purpose include especially alcohols and ketones having 4–10 carbon atoms per molecule. Carbinols are preferred, as well as ketones in which at least one of the alkyl radicals attached to the $>C=O$ group has a branched structure.

Examples of organic oxygen compounds that have a solubility in water of less than 20 g. per 100 ml. at 30° C. are n-butyl alcohol, isobutyl alcohol, secondary butyl alcohol, the various amyl alcohols, methyl isobutyl carbinol, the hexanols, heptanols and octanols, methyl isobutyl ketone, diethyl ketone, methyl n-butyl ketone, diisobutyl ketone.

Application of the limited classes of organic oxygen compounds according to the invention has the advantage that such compounds cause a greater reduction of surface tension than do those of higher solubility in water. Consequently, insofar as better emulsification is the objective, in the present process smaller quantities may suffice. Besides, such organic oxygen compounds generally have higher boiling points than those of good solubility in water, owing to which they can longer continue to exert their anti-foaming effect when the solvent is being removed. For this reason, too, a smaller quantity of this category of substances is needed than of the readily water-soluble organic oxygen compounds.

In consequence, and also because only a very small proportion of the poorly water-soluble organic oxygen compounds will get into the water phase, the process concerned has the important advantage that the risk of the occurrence of coagulum losses through the presence of too much organic oxygen compound is substantially less than in the known processes. On this account, it is possible to control the particle size of the latex within certain limits, and without any appreciable coagulation, by modifying the concentration of the emulsifier, for instance between 1 and 20% w. (on polymer).

An additional advantage is that as a rule the difference in boiling point between the organic oxygen compounds and the customary solvents for the macromolecular substances is large and that no azeotropes are formed between these two types of components, so that these components do not pass over together. For this reason it will almost invariably be possible easily to recover the solvents free from, or virtually free from, organic oxygen compounds.

After the organic oxygen compounds have been removed from the dispersions, for instance by steam stripping, they too can easily be recovered from the water-containing condensates. For, on account of their poor solubility in water, they segregate spontaneously from such condensates, also when they are expelled in the form of an azeotrope with water.

The particle size of the latices obtained can be judged not only by determination of the dimensions, but also from the results of measurements of the viscosity, the surface tension and the optical density of the latices.

At high emulsifier concentrations very fine latices, which therefore have a comparatively high viscosity, are formed without any trouble. These latices, after being concentrated to a solids content of about 40–60% by weight, are, in the case of rubberlike macromolecular materials, especially suitable for use in dipping processes, for applying coatings to articles in general and in particular for carpet backing, tire cord dipping and for impregnating textiles and paper.

If, however, low emulsifier concentrations are applied, latices can be obtained, also without encountering any difficulty, for the preparation of foam latices, especially for producing foams of rubberlike materials. The latices must then be concentrated to a solids content of more than 55% w., for instance to 65% by weight or even more.

Preferably, organic oxygen compounds with a boiling point under normal conditions of less than 195° C. are chosen. As a rule such oxygen compounds will then be expelled from the dispersion during or after the removal of the solvent for the polymer, also via the vapor phase. The representatives most highly preferred are those that have a boiling point under normal conditions of below 150° C., while in certain circumstances representatives are preferably used that have a solubility in water of less than 5 g. per 100 ml. at 30° C.

Generally, the quantity of the organic oxygen compounds used is 0.1–30% (preferably 0.5–20%) by volume calculated on water phase.

The group of the aforesaid macromolecular substances also comprises liquid representatives, in so far as their average molecular weight is not lower than 1,000, for instance the liquid polymers or copolymers of dienes having an average molecular weight of about 1200–12,000.

The new process is of particular importance for the preparation of artificial latices from polymers of vinylidene compounds, such as poly(alpha olefins), conjugated diene polymers, such as polybutadiene polyisoprene, polypiperylene, copolymers of dienes with each other or of dienes with monovinyl aromatic compounds, such as the butadiene/styrene copolymers (in which either the butadiene content or the styrene content may predominate), or from mixtures of such polymers and/or copolymers with each other. The treatment of polymers of vinylpyridines, acrylic esters, methacrylic esters, hydrogenated derivatives of the foregoing polymers, and the like also is contemplated.

The polymers that can be applied in the process according to the invention also comprise the block polymers and copolymers, as well as the graft polymers and copolymers.

In many cases polymers or copolymers will be applied in the form of the solution in which they were formed during their preparation.

According to the viscosity of the solution, the concentration of the solutions to be emulsified according to the invention may vary within wide limits, for instance from 3% w. to 70% w. of macromolecular substance. As a rule, however, concentrations between 5 and 20% w. will be the most suitable.

The solvents that can be used in the present process depend, among other factors, on the nature of the macromolecular substance. Besides aliphatic, cycloaliphatic and aromatic hydrocarbons, nonhydrocarbons for instance chloroform, carbon tetrachloride, carbon disulfide, ethers, and so on, may also be suitable solvents.

Particularly suitable solvents for copolymers built up entirely or predominantly of ethene and propene or butene and which may have been obtained from an additional third comonomer (for instance a diene), are the liquid alkanes or isoalkanes having a boiling point below 150° C. In such cases, methyl isobutyl carbinol has proved to be a very suitable organic oxygen compound.

For preparing artificial latices from polyisoprene a suitable solvent will often be a mixture of branched pentenes, as this polymer is generally prepared in this solvent. With such solutions methyl isobutyl carbinol can again very well be applied as the organic oxygen compound, as can also the butanols of which the hydroxyl group is attached to a primary or secondary carbon atom.

The best results are obtained with the process according to the invention if the ratio by volume of the sum of macromolecular substances and solvent to the sum of water and organic oxygen compounds is between 0.5 and 5.

The emulsification is generally carried out in intensively operating emulsification equipment, such as high-speed colloid mills with a turbomixed fitted in the intake funnel, and also planetary mixers provided with wall scrapers.

Suitable emulsifiers are ionic as well as non-ionic representatives or mixtures thereof. Preferably anionic emulsifiers are applied, such as alkali or ammonium soaps of resin acids and/or fatty acids, for instance of oleic acid, palmitic acid, stearic acid, lauric acid, myristic acid, arachic acid, ricinoleic acid. A very suitable emulsifier of this type is also the morpholine oleate. Other useful anionic emulsifiers are the alkali or ammonium soaps of branched carboxylic acids, of alkyl or arylsulfuric acids, of alkyl or arylsulfonic acids, and also of sulfated or sulfonated glycidyl esters of carboxylic acids. The cationic emulsifiers are also very suitable. To this group belong, for instance, the quaternary ammonium salts, such as tridecylbenzene, hydroxyethylimidazolinium chloride, stearyldimethylbenzylammonium chloride, cetylpyridinium bromide, etc. It is, however, also possible to use nonionic emulsifiers, for instance the phosphoric esters of higher alcohols, such as capryl and octyl alcohol, and also the monoesters of oleic acid and pentaerythritol, sorbitan monooleate, etc.

The emulsifiers may be added in several ways, for instance to the water phase, to the solvent phase, to the organic oxygen compound or to mixtures thereof. The emulsifiers can also be prepared in situ; the emulsifier-forming components may then be distributed, if so desired, over several phases.

During the emulsification there is no objection to the presence in the dispersion of carbon black and/or one or more other reinforcing or non-reinforcing solid fillers, for instance white fillers and certain resins, for instance phenol formaldehyde resins, urea formaldehyde resins, coumarone resins and petroleum resins.

The removal of the solvent, and, in so far as this is possible, also of the organic oxygen compounds, is effected in the vapor phase, preferably utilizing steam.

According to the combination of solvent and organic oxygen compounds chosen, the removal of these components can be carried out simultaneously or in succession, if necessary by raising the temperature of expulsion. Azeotropic formation may then occur, but usually only of the organic oxygen compound with water.

Should there still be any trouble of foam formation during removal of solvent and organic oxygen compound, it can simply be obviated, if desired, by blowing a gas, for instance air, in countercurrent through the foam.

The latices obtained by the process according to the invention after removal of the solvent and preferably also of the organic oxygen compound, can be concentrated in any desired manner. Thus, one can utilize for this purpose high-speed centrifuges, creaming or thickening agents, or evaporation, for instance in a film evaporator. In a more preferred alternative, the concentration of water-soluble emulsifier in the latex to be concentrated is raised to 20–100% w. of the macromolecular substance dispersed, after which the unstable suspension obtained is allowed to segregate either spontaneously or not spontaneously with formation of a top layer that generally contains virtually all the macromolecular substance in the form of a concentrated latex.

The process concerned is easy and quick and, if so desired, can be carried out continuously.

Example 1

100 parts by volume of a 7.4% w. (i.e. 5% w./v.) solution of a polyisoprene in a technical mixture of tertiary amylenes were emulsified with 90 parts by volume of water, in which was dissolved 5% w. of potassium oleate, calculated on polymer, and to which had been added 10 parts by volume of methyl isobutyl carbinol (MIBC). The polyisoprene consisted to an extent of 92.5% w. of the cis-1,4-configuration and had an intrinsic viscosity of 7.4. The mixture was emulsified for 15 minutes in a high-speed colloid mill, having an turbomixer built in the intake funnel.

The emulsion obtained was completely freed of organic liquids by steam stripping, first at about 35–40° C. of the amylenes (boiling point 34° C.) and then at 93–100° C. of the methyl isobutyl carbinol (boiling point 130° C.) As this alcohol does not form an azeotrope with amylenes, the amylenes expelled could be used afresh as solvent after condensation without any further treatment. When the methyl isobutyl carbinol was removed an azeotrope of this alcohol, 75% v. of which consisted of water, was expelled. Upon condensation of this azeotrope two layers were at once formed, of which the upper one consisted almost entirely of methyl isobutyl carbinol and the bottom one almost exclusively of water.

The remaining latex, which contained 4.8% w. of polymer, was concentrated to a solids content of 61% w. by being centrifuged in a centrifuge at a speed of 20,000 revolutions per minute.

The surface tension and the viscosity of the concentrated latex were determined. The viscosity measurements were carried out at 25° C. in a Drage viscometer using the appropriate standard cup and the rotor (spindle) with a diameter of 24 mm., at 20.5, 64 and 200 r.p.m.

For comparison the experiment was repeated (experiment 2) under otherwise similar conditions, but now with 20% v. of isopropyl alcohol (IPA) calculated on water phase, instead of 10% v. of methyl isobutyl carbinol. The quantities of alcohol were in both cases the minimum quantities that are under the given conditions necessary to prevent troublesome foam formation. Isopropyl alcohol is an alcohol of very high solubility in water. The results, as regards coagulum losses and surface tension and viscosity of the latices obtained, are presented in Table I.

In a third test (experiment 3), the conditions of experiment 1 were repeated, except that the methyl isobutyl carbinol was added in two stages, one-half before emulsification and one-half after emulsification.

TABLE I

| Exp. No. | Nature | Quantity Calc. on Water Phase | Amount of Coagulum After Steam Treatment, Percent w. on Polymer | Properties of Concentrated Latex | | | |
|---|---|---|---|---|---|---|---|
| | | | | Surface Tension, dyn./cm.² | Drage Viscosity, cp., Rotor φ 24 mm. (No. of Revolutions per Min.) | | |
| | | | | | (20.5) | (64) | (200) |
| 1 | MIBC | 10 | <1 | 30 | 304 | 195 | 133 |
| 2 | IPA | 20 | 5 | 30 | 890 | 450 | 250 |
| 3 | MIBC | 10 | <1 | 30 | 290 | 185 | 132 |

The concentrated latex obtained in experiment 1 was particularly suitable for application as a foam latex. The concentrated latex of experiment 2 was far less suitable for this purpose. Moreover, the loss of coagulum in experiment 2 was much too high for commercial purposes. The concentrated latex obtained in experiment 1 was mixed, per 100 parts by weight of polyisoprene, with 1 part by weight of sulfur, 1 part by weight of zinc dithiocarbamate and 2 parts by weight of zinc oxide. The mixture was then spread out to a film on a glass plate. After being dried this film was vulcanized at 100° C. for 25 minutes. The vulcanized film proved to have a tensile strength of 256 kg./cm.², a modulus at 300% elongation of 8 kg./cm.², an elongation at rupture of 1043% and a set at break of 9%.

Example II 100 parts by volume of the polyisoprene solution in amylenes described in Example I was stirred with 3.3 parts by volume of a 30% w./v. solution of polystyrene in benzene, so that the mixture contained 20 parts by weight of polystyrene to 100 parts by weight of polyisoprene. The mixture was then emulsified for 15 min. with the aid of the apparatus described in Example I with 90 parts by volume of water in which 5% w. of potassium oleate, calculated on polymer, was dissolved and to which 10 parts by volume of methyl isobutyl carbinol had been added.

The amylenes, the benzene and the methyl isobutyl carbinol were completely removed from the dispersion by steam stripping.

The resultant latex, containing 5.1% w. of polymer mixture, was then concentrated in a film evaporator to a solids content of 64.5% w. After this concentration the latex was still thin-liquid.

Of the concentrated latex a vulcanized film was made as described at the end of Example I. The film proved to have a tensile strength of 136 kg./cm.$^2$, a modulus at 300% elongation of 13 kg./cm.$^2$, an elongation at rupture of 868% and a set at break of 4%.

*Example III*

In order to know the effect of the nature and the quantity applied of some organic oxygen compounds upon the interfacial tension of the polymer solution/water phase in the process according to the invention, some determinations of the interfacial tension were carried out at 25° C. in the absence of polymer, the poorly water-soluble organic oxygen compounds being sec-butyl alcohol and methyl isobutyl carbinol, the solvent being a technical mixture of tertiary amylenes. The nature and quantity of the organic oxygen compound were varied in these determinations. In all the determinations the ratio by volume of amylenes (water+organic oxygen compound) was equal to 1. For comparison the effects of isopropyl alcohol and acetone as the organic oxygen compounds of good solubility in water were also ascertained. The results are shown in Table II.

TABLE II.—ORGANIC OXYGEN COMPOUND

| Nature | Solubility in water, g. per 100 ml. | Percent v. as referred to water plus org. oxygen compound | Interfacial tension, dyne/cm.$^2$ |
|---|---|---|---|
| None | | 0 | 39 |
| Sec. butyl alcohol | 12.5 | 5 | 27 |
| | | 10 | 12 |
| | | 20 | 7.5 |
| | | 30 | 7.5 |
| Methyl isobutyl carbinol | 1.8 | 5 | 22.5 |
| | | 10 | 17.5 |
| | | 20 | 15 |
| | | 30 | 14 |
| Isopropyl alcohol | ∞ | 5 | 29.5 |
| | | 10 | 20.5 |
| | | 20 | 8.5 |
| | | 30 | 6.5 |
| Acetone | ∞ | 5 | 31 |
| | | 10 | 20 |
| | | 20 | 15 |
| | | 30 | 14.5 |

We claim as our invention:

1. In the process for preparing a latex of a polymer of the group consisting of polymers of polymerizable vinylidene compounds wherein one volume of a solution of said polymer in a water-immiscible solvent having 4–10 carbon atoms per molecule, is emulsified with 0.5–5 volumes of an aqueous phase comprising water and an emulsifying agent, by intense agitation whereby colloidal particles of the polymer solution suspended in the aqueous phase are formed, removing the hydrocarbon solvent by vaporization and recovering a latex therefrom, the improvement comprising adding to the mixture of polymer solution and aqueous phase prior to hydrocarbon vaporization 0.5–30% volume based on the aqueous phase of an aliphatic oxygen compound having 4–10 carbon atoms per molecule and having a solubility in water of less than 20 grams per 100 cc. water at 30° C. of the group consisting of alcohols and ketones.

2. A process according to claim 1 wherein the oxygen compound is added to the mixture subsequent to emulsification.

3. Process for preparing a latex of polymers of conjugated dienes, which comprises emulsifying one volume of a solution of said polymer in a hydrocarbon solvent having 4–10 carbon atoms per molecule with 0.5–5 volumes of an aqueous phase comprising water and an emulsifying agent, and 0.5–30% by volume based on said aqueous phase of an aliphatic oxygen compound miscible with said hydrocarbon solvent, having 4–10 carbon atoms per molecule and having a solubility in water of less than 20 grams per 100 cc. water at 30° C., of the group consisting of alcohols and ketones by intense agitation whereby colloidal particles of the polymer solution suspended in the aqueous phase are formed, removing the hydrocarbon solvent by vaporization and recovering a stable polymer latex.

4. Process for preparing a latex of a polymerized conjugated diene which comprises emulsifying one volume of a solution of a polymerized conjugated diene in a hydrocarbon solvent having 4–10 carbon atoms per molecule, with 0.5–5 volumes of an aqueous phase comprising water and an emulsifying agent and 0.5–30% by volume, based on said aqueous phase, of a hydrocarbon-soluble alcohol having 4–10 carbon atoms per molecule and having a water solubility of less than 20 grams per 100 cc. water at 30° C., by intense agitation whereby colloidal particles of the polymer solution suspended in the aqueous phase are formed, removing the hydrocarbon solvent and alcohol by vaporization and recovering a stable polymer latex.

5. Process for preparing a polyisoprene latex which comprises emulsifying one volume of a solution of polyisoprene in amylenes with 0.5–5 volumes of an aqueous phase comprising water and an emulsifying agent, and 0.5–30% by volume, based on said aqueous phase, of methyl isobutyl carbinol, by intense agitation whereby colloidal particles of the polymer solution suspended in the aqueous phase are formed, removing the organic liquids by vaporization and recovering a stable polyisoprene latex.

6. A process according to claim 3 wherein the polymer is polyisoprene and the hydrocarbon solvent is an aromatic hydrocarbon.

References Cited by the Examiner

UNITED STATES PATENTS 2,615,010  10/1952  Troyan _____ 260—29.7
2,953,556   9/1960  Wolfe et al. _____ 260—94.7

MURRAY TILLMAN, *Primary Examiner.*

J. ZIEGLER, *Assistant Examiner.*